United States Patent
Kolmykov-Zotov et al.

(10) Patent No.: US 7,489,306 B2
(45) Date of Patent: Feb. 10, 2009

(54) TOUCH SCREEN ACCURACY

(75) Inventors: Alexander J. Kolmykov-Zotov, Sammamish, WA (US); Emily K. Rimas-Ribikauskas, Seattle, WA (US); Matt Lerner, Seattle, WA (US); Reed Townsend, Seattle, WA (US); Steven P. Dodge, Sammamish, WA (US); Robert J. Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 11/018,679

(22) Filed: Dec. 22, 2004

(65) Prior Publication Data

US 2006/0132460 A1    Jun. 22, 2006

(51) Int. Cl.
G09F 3/41    (2006.01)
(52) U.S. Cl. ...................... 345/173; 345/178
(58) Field of Classification Search ............ 345/156, 345/157, 163, 169, 173, 179, 168, 418, 619, 345/654, 763, 629, 178; 178/18.01; 715/801, 715/863, 768, 788, 781; 382/187, 181
See application file for complete search history.

(56) References Cited

U.S. PATENT DOCUMENTS

| | | | | |
|---|---|---|---|---|
| 4,968,257 A * | 11/1990 | Yalen | ............. | 434/308 |
| 5,237,654 A * | 8/1993 | Shackelford et al. | ......... | 715/804 |
| 5,327,161 A * | 7/1994 | Logan et al. | ............. | 345/157 |
| 5,694,150 A * | 12/1997 | Sigona et al. | ............. | 715/856 |
| 5,900,863 A * | 5/1999 | Numazaki | ............. | 345/158 |
| 6,057,830 A * | 5/2000 | Chan et al. | ............. | 345/157 |
| 6,094,197 A * | 7/2000 | Buxton et al. | ............. | 715/863 |
| 6,167,439 A * | 12/2000 | Levine et al. | ............. | 709/217 |
| 6,269,187 B1 * | 7/2001 | Frink et al. | ............. | 382/187 |
| 6,411,283 B1 * | 6/2002 | Murphy | ............. | 345/173 |
| 6,429,846 B2 * | 8/2002 | Rosenberg et al. | ......... | 345/156 |
| 6,448,956 B1 * | 9/2002 | Berman et al. | ............. | 345/156 |
| 6,473,069 B1 * | 10/2002 | Gerpheide | ............. | 345/157 |
| 6,529,210 B1 * | 3/2003 | Rees | ............. | 345/654 |
| 6,597,347 B1 * | 7/2003 | Yasutake | ............. | 345/173 |
| 6,727,892 B1 * | 4/2004 | Murphy | ............. | 345/173 |
| 6,819,312 B2 * | 11/2004 | Fish | ............. | 345/156 |
| 7,197,718 B1 * | 3/2007 | Westerman et al. | ......... | 715/801 |
| 7,304,638 B2 * | 12/2007 | Murphy | ............. | 345/173 |
| 2002/0044132 A1 * | 4/2002 | Fish | ............. | 345/156 |
| 2002/0122029 A1 * | 9/2002 | Murphy | ............. | 345/173 |
| 2002/0122197 A1 * | 9/2002 | Abir | ............. | 358/1.11 |
| 2002/0141643 A1 * | 10/2002 | Jaeger | ............. | 382/181 |

(Continued)

*Primary Examiner*—Prabodh M Dharia
(74) *Attorney, Agent, or Firm*—Lee & Hayes, PLLC

(57) ABSTRACT

A user interface is provided allowing a user to simulate mouse hovering with the user's finger on a touch-sensitive display. When a finger or other stylus touches the touch-sensitive display adjacent to a display cursor, a control appears that enables the user to drag the cursor about the display by dragging the control. Manipulation of the control instead of the cursor allows the user to see the cursor while it moves, making it easier to accurately target small objects that were previously difficult to target directly. In addition, a tap or other user touch input is funneled from the control to the location of the cursor itself. For example, if the user taps on the control, the tap causes an event such as a left mouse button down event to be generated at the location of the cursor as opposed to the location of the tap, thereby improving accuracy.

17 Claims, 6 Drawing Sheets

U.S. PATENT DOCUMENTS

| | | | |
|---|---|---|---|
| 2003/0193481 A1* | 10/2003 | Sokolsky | 345/173 |
| 2004/0017355 A1* | 1/2004 | Shim | 345/157 |
| 2004/0104898 A1* | 6/2004 | Badarneh | 345/169 |
| 2004/0119744 A1* | 6/2004 | Chan | 345/763 |
| 2006/0007151 A1* | 1/2006 | Ram | 345/163 |
| 2006/0044259 A1* | 3/2006 | Hotelling et al. | 345/156 |
| 2006/0119589 A1* | 6/2006 | Rosenberg et al. | 345/173 |
| 2007/0083825 A1* | 4/2007 | Chaudhri et al. | 715/788 |
| 2007/0089066 A1* | 4/2007 | Chaudhri et al. | 715/768 |

* cited by examiner

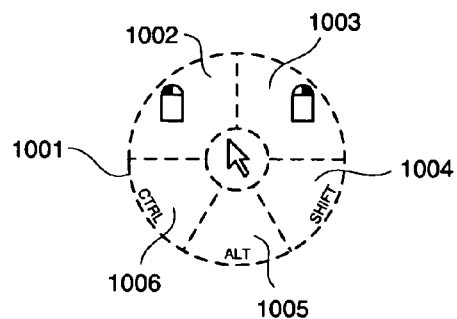
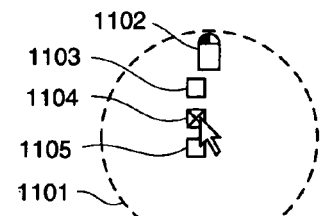
Fig. 10                  Fig. 11
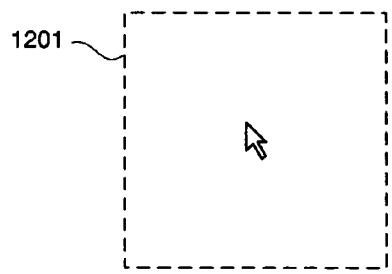
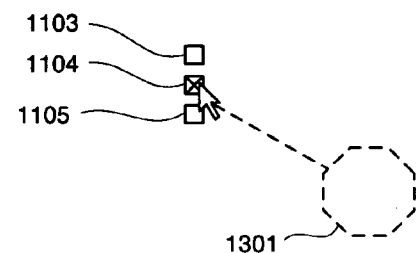
Fig. 12                  Fig. 13
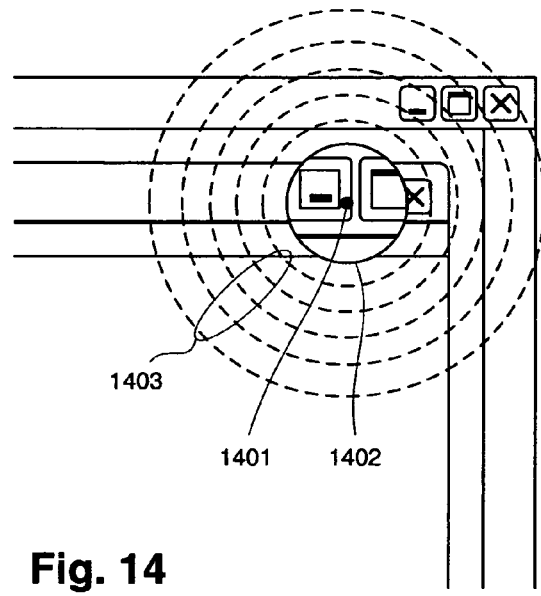
Fig. 14

TOUCH SCREEN ACCURACY

FIELD OF THE INVENTION

Aspects of the present invention are directed generally to controlling a displayed cursor on a computer display, and more specifically to controlling a cursor with a user's finger by interacting with a cursor handle associated with the cursor.

BACKGROUND OF THE INVENTION

Touch-sensitive surfaces are rapidly becoming more common in computing devices. They are very convenient as they allow a user to make natural gestures familiar to the user in other contexts, such as by entering handwriting using a special stylus such as an elongated pen-like object having a pointed tip. Many of these devices also allow input to be provided by user's fingertip. The term touch-sensitive surface or device will be used herein to refer to such surfaces or devices that are configured to detect the touch of any type of "stylus" such as a specially-design stylus device or a user's finger. One disadvantage of using a finger or other broad-tipped stylus with a touch-sensitive device is that it is more difficult to accurately target where the finger will and will not touch. For instance, where the touch-sensitive device is combined with a display (thus, a touch-sensitive display), it is difficult to use a finger to target small displayed objects so that they may be selected and/or manipulated. There is therefore a need to provide a way for users to be able to use a touch-sensitive device with their fingers or other inherently imprecise styluses, while maintaining a reasonable level of accuracy.

In addition, various pointing devices such as mice and man-made pen-type stylus digitizers provide for a hover function, meaning that the user may position the cursor over an area without generating a click. However, few if any touch-sensitive displays have this capability when used by a human finger. There is therefore a need to provide a way for users to hover the cursor using only their finger on a touch-sensitive display.

SUMMARY OF THE INVENTION

Aspects of the present invention address the above problem by providing a user interface usable with a touch-sensitive display that allows a user to enable precise targeting even though the input device is inherently imprecise (e.g., a clumsy, coarse, and relatively large human finger). For example, the user may precisely target a particular location or simulate cursor hovering with the user's finger, even though the targeted location or the cursor may be relatively tiny compared with the finger. When the user touches his or her finger on the touch-sensitive display adjacent a displayed cursor, a control appears that enables the user to drag the cursor about the display by dragging the control. Manipulation of the control, also known herein as a cursor handle, instead of the cursor allows the user to see the cursor while it moves, making it easier to accurately target small objects that were previously difficult to target. The cursor handle may, in some respects, be compared with a tool such as tweezers that allows the user to precisely interact with relatively tiny areas of a user interface such as a touch-sensitive display.

Further aspects of the invention are directed to funneling an imprecise tap near the cursor to the more precise location of the cursor itself. For example, if the user taps close to the cursor, but not necessarily directly on the cursor, the tap causes an event such as a left mouse button down event to be generated at the location of the cursor as opposed to the location of the tap. Again, this further improves accuracy by inferring the user's likely intent. Since the user has positioned the cursor using the cursor handle, it may be reasonable for the computer to infer that a subsequent tap near the cursor is intended by the user to be a tap on the cursor itself.

Further aspects of the invention are directed to summoning the cursor handle and providing feedback to the user as to which cursor control mode is about to be entered. The cursor handle may be provided in any of a number of forms. For example, the cursor handle may be displayed and/or interacted with in such a manner that it would be fairly intuitive for the user to manipulate the cursor using the cursor handle, much as using a tweezers to manipulate a tiny object is intuitive.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 10-14 show further illustrative embodiments of a cursor handle, in accordance with at least one aspect of the present invention.

DETAILED DESCRIPTION OF ILLUSTRATIVE EMBODIMENTS

Figure 1:
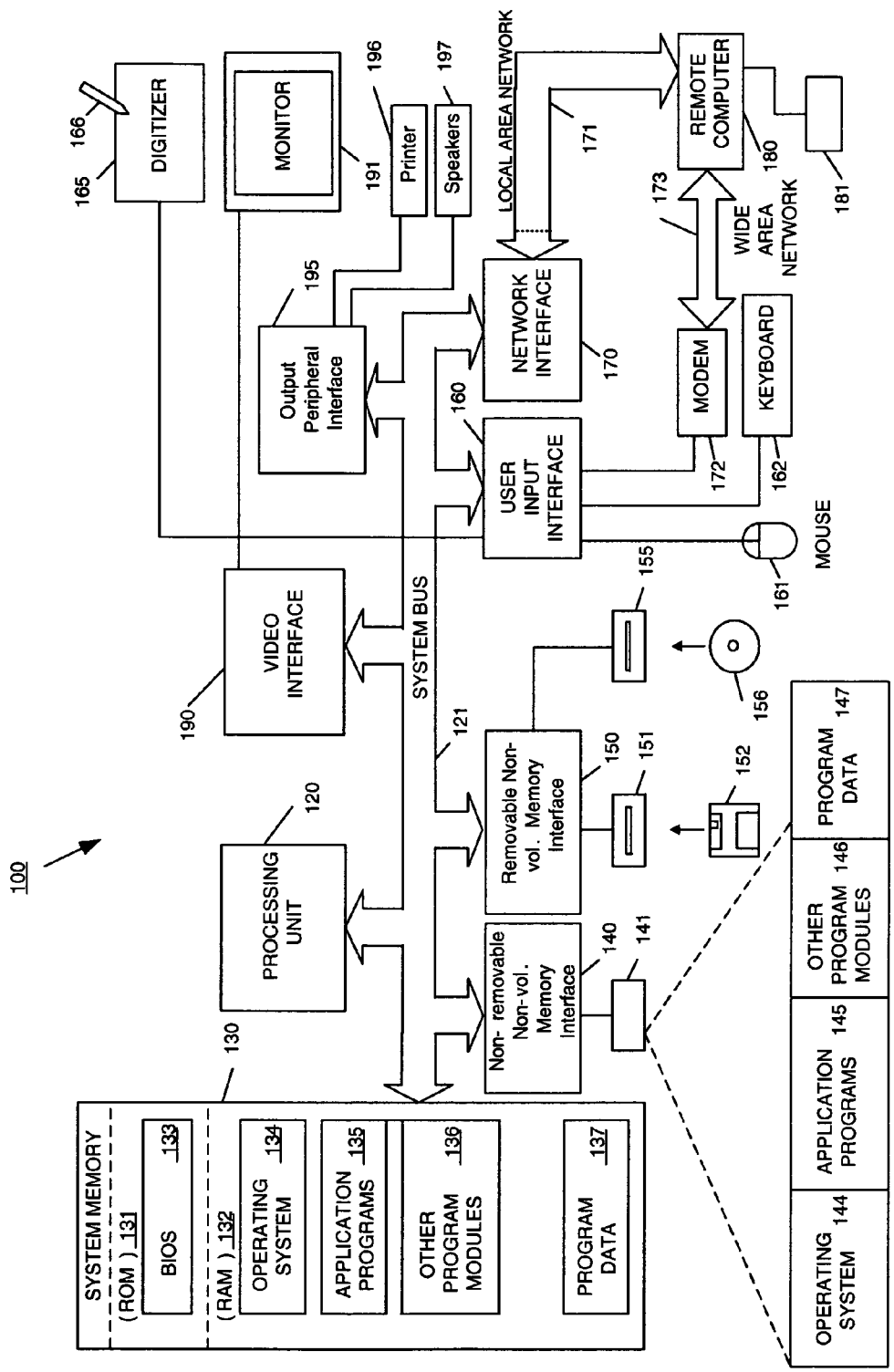
FIG. 1 is a functional block diagram of an illustrative computing environment that may be used with aspects of the present invention.

Aspects of the present invention may be used in connection with a computing device such as the computer 100 illustratively shown in FIG. 1. Components of the computer 100 may include, but are not limited to, a processing unit 120, a system memory 130, and a system bus 121 that couples various system components including the system memory 130 to the processing unit 120. The system bus 121 may include any of several types of bus structures including a memory bus or memory controller, a peripheral bus, and/or a local bus using any of a variety of bus architectures.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in the ROM 131. The RAM 132 typically contains data and/or program modules that are immediately accessible to and/or presently being operated on by processing unit 120. The computer 100 may also store and/or execute an operating system 134, one or more application programs 135, other program modules 136, and/or program data 137. The computer 100 may further include other removable/non-removable, volatile/nonvolatile computer storage media. By way of example only, FIG. 1 illustrates a hard disk drive 141 that reads from and/or writes to non-removable, nonvolatile magnetic media, a magnetic disk drive 151 that reads from and/or writes to a removable nonvolatile magnetic disk 152, and an optical disk drive 155 that reads from and/or writes to a removable, nonvolatile optical disk 156 such as a CD ROM or other optical media. Other removable/non-removable and volatile/nonvolatile computer storage media that may be used include, e.g., magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. Data stored on any of the various computer storage media may be stored in a variety of formats. For example, data may be stored as discrete portions such as files or other items. An electronic file system, which may be part of the operating system 134 and/or separate from it, may be responsible for managing the storage, retrieval, and/or searching of items and other data on the computer storage media. The electronic file system may be implemented as software, hardware, and/or firmware.

A user may enter commands and information into the computer 100 through input devices such as a touch-sensitive device (e.g., digitizer) 165, or a keyboard 162 and/or a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be coupled via other interface and bus structures such as a parallel port, a game port, or a universal serial bus (USB). A monitor 191 or other type of display device is also connected to the system bus 121 via an interface such as a video interface 190. The computer 100 may further include other peripheral output devices such as speakers 197 and printer 196, which may be connected to the system bus 121 via an output peripheral interface 195.

A touch-sensitive device 165, which may have an accompanying stylus 166, is provided in order to digitally capture freehand input. Although a direct connection between the touch-sensitive device 165 and the user input interface 160 is shown, in practice, the touch-sensitive device 165 may be coupled to the processing unit 120 directly, via parallel port or another interface, or via the system bus 121 by any technique, either wired or wirelessly. User input to the touch-sensitive device 165 may be in the form of touch input (i.e., where an object such as the stylus 166, a user's finger, or another type of stylus, physically contacts the touch-sensitive surface of the touch-sensitive device 165). The term "stylus" is used broadly herein to include the human finger or other body parts as well as man-made objects that may be used for providing input to the touch-sensitive device 165. Input to the touch-sensitive device 165 may also be in the form of hover input, where the stylus does not touch the touch-sensitive surface but is sensed to be proximate to the touch-sensitive surface. Thus, the touch-sensitive device 165 may be configured to detect touch input (such as tapping or dragging gestures physically made on the touch-sensitive surface) and/or hover input (such as in-air gestures made near the touch-sensitive surface). The touch-sensitive device 165 may be separate from the display device (e.g., monitor 191) or may be integrated with a display device, such that the surface that is touch-sensitive is also a display. In the latter case, such a device is referred to as a touch-sensitive display. Touch-sensitive displays, and indeed touch-sensitive devices, are well known. Touch-sensitive displays are also known where the digitizer is positioned in a pouch behind a display portion, which in turn is protected by a clear acrylic sheet. Alternatively, the touch-sensitive digitizer may transparent and is integrated with the acrylic sheet, with the display portion being behind the digitizer. In both cases, the digitizer and the display portion may be separate physical components but packaged together in a manner that effectively acts as a single unit. Conventional tablet-style computers use these types of touch-sensitive displays.

The touch-sensitive device 165 may further be integrated with the entirety of the computer 100, packaged as a single unit. For example, the computer 100 may be a portable laptop computer where the integrated display is a touch-sensitive display. Or, the computer 100 may be a portable tablet-style computer where the integrated display is a touch-sensitive display. Again, such single-unit computers with integrated touch-sensitive displays are well known.

The computer 100 may operate in a networked environment using logical connections to one or more remote computers, such as a remote computer 180. The remote computer 180 may be a personal computer (such as a desktop computer, a laptop computer, or a tablet-style computer), a handheld computer (e.g., a personal digital assistant), a server, a router, a network PC, a peer device, or other common network node, and typically includes many or all of the elements described above relative to the computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. The computer 100 may further include wired and/or wireless capabilities. For example, the network interface 170 may be BLUETOOTH, SWLan, and/or IEEE 802.11 compatible. It is appreciated that other wireless communication protocols may be used in conjunction with these protocols or in place of these protocols.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160 or other appropriate mechanism.

Figure 2:
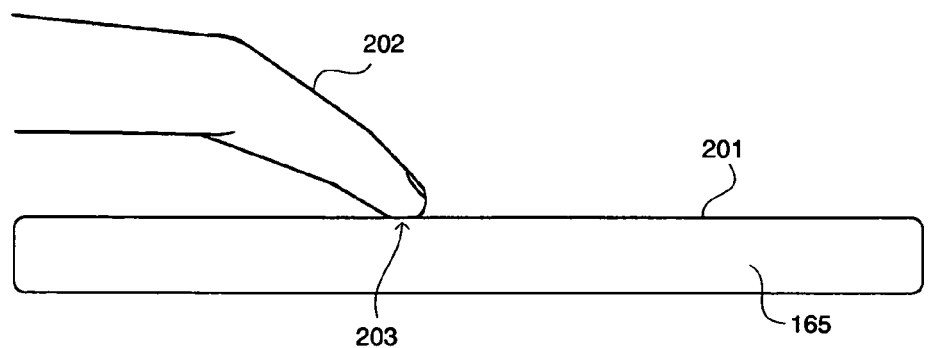
FIG. 2 is a side view showing a user's finger touching a touch-sensitive display surface of a touch-sensitive device, in accordance with at least one aspect of the present invention.

Referring to FIG. 2, the touch-sensitive device 165 may have a touch-sensitive display 201 (or a non-display touch-sensitive surface). With such a configuration, the user may apply a stylus such as stylus 166 or the user's own finger 202 to provide input to the touch-sensitive display 201, and the user may be able to view feedback to the input displayed on the touch-sensitive display 201. Where the input is touch input, a contact area 203 may occur between the user's finger 203 and the touch-sensitive surface 201. While the remainder of this disclosure will discuss aspects of the invention interacting with input by a user's finger, as the invention is especially useful in such a situation, it should be understood that the invention may be used with any type of stylus.

Figure 3:
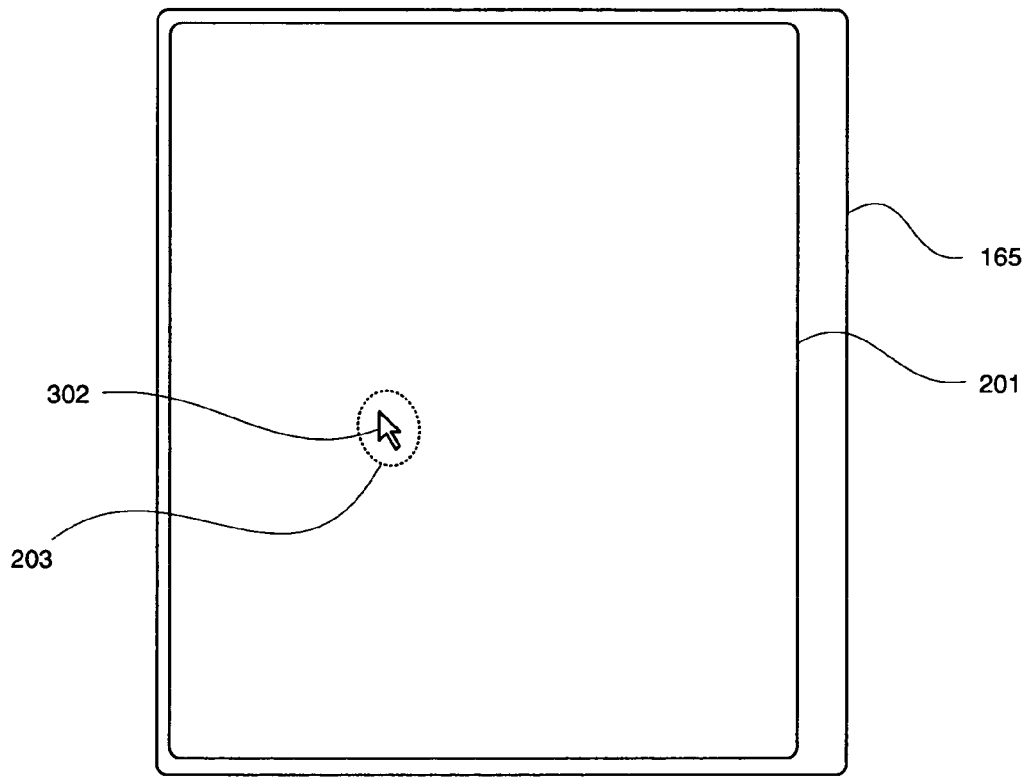
FIG. 3 is a plan view of the touch-sensitive device of FIG. 2, in accordance with at least one aspect of the present invention.

Referring to FIG. 3, the touch-sensitive display 201 may display a cursor 302, which is a displayed control that is movable about the touch-sensitive display 201 and used to indicate where the user intends to send an event. In tablet-style computers, for example, it is common for the cursor 302 to be controlled in accordance with the position of the stylus, such that the cursor 302 is located directly under the stylus. The user may typically make a gesture, such as a tap gesture, onto the touch-sensitive display 201, in order to emulate a left mouse button down (also known as a left click) or a right mouse button down (also known as a right click). The left and right mouse button down events (which may be followed by a left or right mouse button up event, or not) are well known to many operating systems, such as Microsoft brand WINDOWS operating systems, as well as to many software applications. Where a right click is not supported or where additional features are desired, other behaviors (such as shortcut access) may be provided in place of or in addition to a right click. Although the cursor 302 is shown as a familiar arrow-style cursor, the cursor 302 may be any shape such as a point or a hand. Also, the shape of the cursor 302 may change depending upon the displayed location of the cursor 302 in relation to other displayed features and/or the status of an application or the operating system running on the computer 100.

As can be seen in FIG. 3, the size of contact area 203 may be on the order of, or substantially larger than, the cursor 302 itself. Regardless of the relative size of the cursor 302, the contact area 203 may be expected to be larger than a few pixels on the touch-sensitive display 201, due to the natural size of the human fingertip. For example, the contact area 203 may be on the order of about a quarter of a square inch, and may be about a half inch in width and/or length. Of course, the contact area 203 may be smaller or larger depending upon the size of the user's finger or other stylus being used. In any event, the contact area 203 may be sufficiently large so as to effectively block the user from being able to effectively see the displayed cursor 302 and/or anything displayed under or very near the cursor 302.

Accordingly, aspects of the present invention may allow the user to control the cursor 302 without having to contact the touch-sensitive display over the cursor 302. Instead, the user may apply a touch input to a location away from the cursor 302 so that the user may more easily see the cursor 302 and/or what it being displayed under or near the cursor 302. This may allow the user to more effectively and accurately control the location of the cursor 302. The user may need to touch a location sufficiently close to the cursor 302 to ensure that this is what the user intended, and indeed the touch may need to be so close that the user likely would not even realize that the user is not applying touch directly on the cursor 302 itself. In addition, the user may be able to funnel an event to the location of the cursor 302 even though the user is providing input triggering the event at a location away from the cursor 302. Again, this may allow the user to more effectively and accurately control where an event, such as a left or right mouse button down event, is sent.

Figure 4:
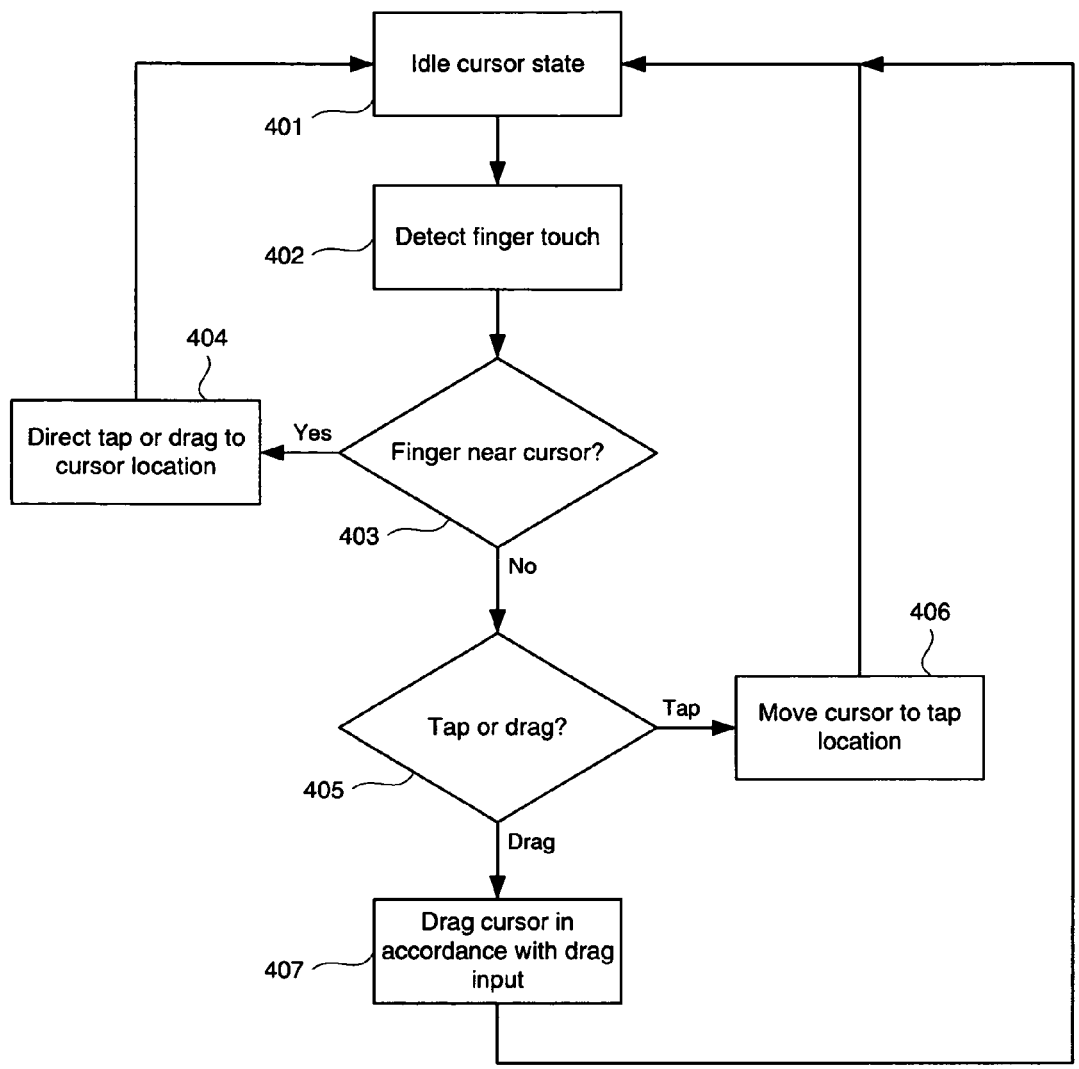
FIG. 4 is a flow chart showing illustrative steps that may be taken to control the cursor, in accordance with at least one aspect of the present invention.

Referring to FIG. 4, the cursor 302 may be in an idle state in step 401. However, in response to detecting a finger touch (or other particular type of stylus) in step 402, the computer 100 may determine in step 403 whether the finger is providing touch input near the cursor 302, such as within a particular "active" region associated with the cursor 302. This active region may be adjacent to the cursor 302 and may follow movements of the cursor 302 about the touch-sensitive display 201. For example, referring to FIG. 5, an active region may be defined as the shaded region between inner boundary 502 and outer boundary 503, which in this example are concentric circles (which may be considered hollow rings or solid plates, as desired) centered about and surrounding the cursor 302. The active region is shaded in FIG. 5 for ease of explanation. However, the active region and the boundaries 502, 503 may or may not be displayed. In this figure, the contact area 203 is shown to be within the active region because the center 504 of the contact area 203 is within the active region. However, the computer 100 may determine whether the contact area 203 is within the active region in other ways, such as whether the entirety of the contact area 203 is within the active region. The active region may be of any shape and size, and is not limited to the ring shape shown in FIG. 5. However, it may be preferable that the active region is of a sufficient size that a user's finger may fit at least substantially within the active region. For example, the active region may extend a quarter inch, half inch, an inch, or more from the cursor 302. The active region may be of an appropriate size so as to accommodate a gloved finger, e.g. a leather glove or gloves associated with aquatic or lunar environments, which tends to be much larger than an ungloved human finger. The size of the active region may be manually or automatically selected in accordance with the size of the user's finger and/or the environment in which the system is being used. Visible or audible feedback may occur in response to touching a location adjacent to the cursor 302, such as a quarter inch or a half inch away from the cursor 302 or more, depending upon the size and shape of the active region.

Figure 5:
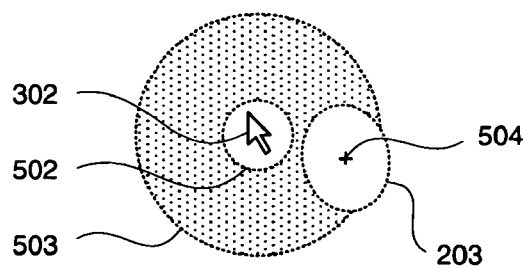
FIG. 5 shows an illustrative embodiment of an active region associated with a cursor, in accordance with at least one aspect of the present invention.
Figure 6:
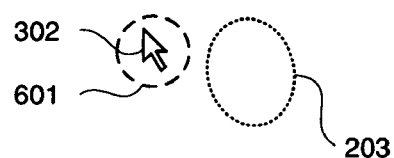
FIGS. 6-9 show an illustrative embodiment of a feedback indicator expanding away from the cursor over time, in accordance with at least one aspect of the present invention.
Figure 7:
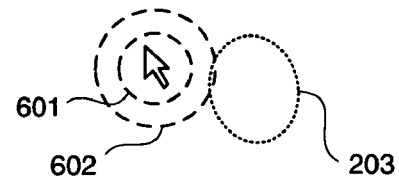
Figure 8:
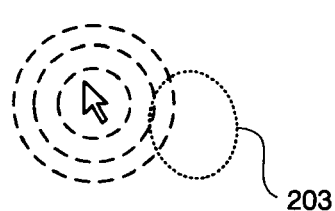
Figure 9:
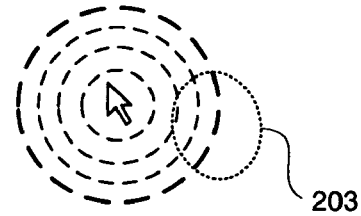

The feedback, which may indicate to the user that the cursor control mode is about to change or that a gesture has been performed such as a tap, may occur immediately upon detection of the touch input shown in FIG. 5, or the feedback may begin upon expiration of a time delay after detection of the touch input. The feedback may be in the form of a displayed object, such as shown for example in FIGS. 6 through 9, which are presented in sequential order. In FIG. 6, a first circle 601 may initially be displayed, wherein the first circle is centered about and surrounding the cursor 302. In FIG. 7, a second concentric circle 602 may later be added to the first circle, wherein the second circle has a larger radius than the first circle. Again, as shown in FIGS. 8 and 9, third, fourth, or even more concentric and larger circles may be added over time until one of the circles eventually reaches the contact area 203. A circle may be determined to have reached the contact area 203 when, e.g., it first touches any part of the contact area 203, such as does circle 602, or when it first reaches or extends beyond the center point 504 of the contact area 203, as does the outer circle in FIG. 9. Alternatively, the feedback may not grow or expand but may alter its appearance in some other manner over time. For example, the feedback may fade in and/or out.

Referring again to FIG. 4, if the computer 100 determines in step 403 that the finger is near the cursor 302, then in step 404 if the finger provides a tap input then the tap is directed, or "funneled," to the location of the cursor 302 instead of the location of the finger. Alternatively, if the finger provides a drag input then the drag is directed to the location of the cursor, possibly causing an object, if any, under the cursor to be selected and dragged along with the cursor.

Thus, in the special cursor control mode, the cursor may be moved in response to touch input provided adjacent to the cursor 302. For example, in FIGS. 5-9, the contact area 203 resulting from a touch input is adjacent to the cursor 302; the touch input is away from and not contacting the cursor 302 itself. In addition, events (such as mouse button down/up events) may be funneled to the location of the cursor 302, such that the events take place at the location of the cursor 302, in response to touch input made adjacent the cursor 302. Referring to FIGS. 10 through 14, at the end of the feedback in step 404, the displayed feedback may be replaced with a displayed control for controlling the cursor. Such a control, also called herein the cursor handle, may be displayed adjacent to the cursor and may provide the user with a visual indication of where a touch input may be made to control the cursor 302. In FIG. 10, an illustrative cursor handle 1001 is shown (indicated by broken lines) adjacent the cursor 302. In this embodiment, the cursor handle 1001 is displayed as a ring surrounding the cursor 302 and subdivided into five regions 1002, 1003, 1004, 1005, 1006, which will be discussed further below. Once the feedback has completed, the user's finger remains and is now touching a portion of the cursor handle 1001. The user may then drag his or her finger across the touch-sensitive display 201 in order to control movement of the cursor 302 and the cursor handle 1001. Movement of the cursor using a cursor handle is now described in connection with FIGS. 15 and 16.

The cursor handle may be invoked in any of a number of ways, such as (but not limited to) by holding the user's finger down near the cursor 302, or alternatively by activating the cursor handle using a hardware or software button, by beginning a drag operation from a dedicated and/or predefined portion of the screen such as the taskbar, the Start button (where a Microsoft WINDOWS brand operating system is being used), or a portion of a window such as the title bar, or even from a portion of the screen beyond where a display is provided (where the screen extends beyond a displayable portion).

Figure 15:
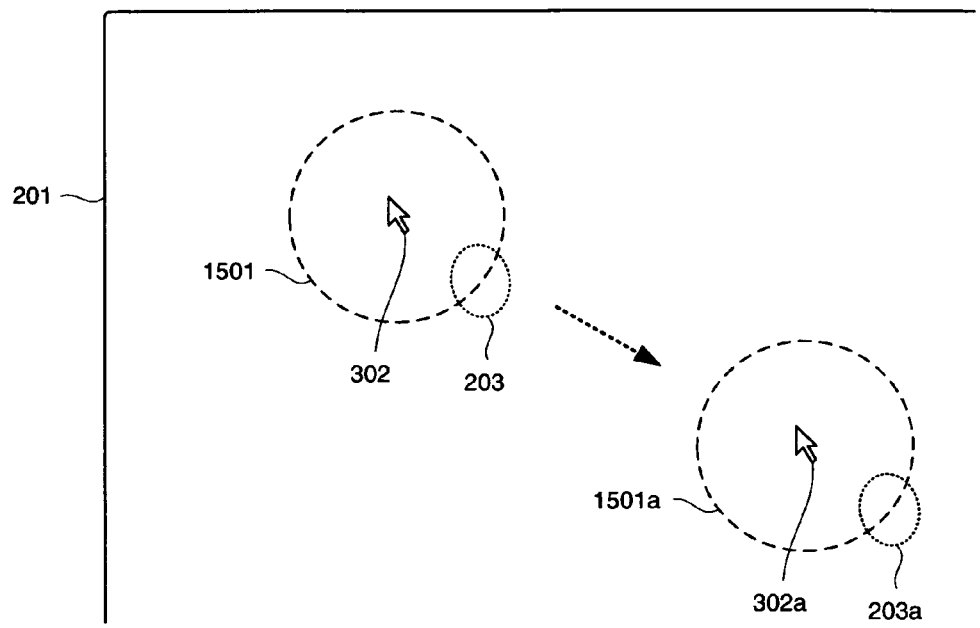
FIGS. 15 and 16 illustrate movement of the cursor using a cursor handle, in accordance with at least one aspect of the present invention.
Figure 16:
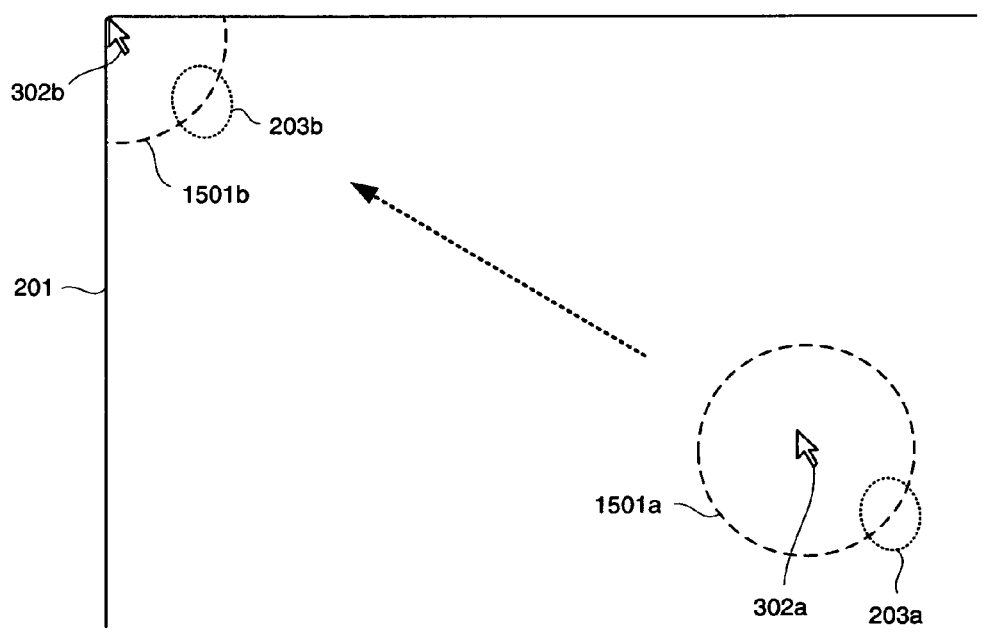

In FIG. 15, another illustrative cursor handle 1501 is shown. In this embodiment, the cursor handle 1501 is a simple circle surrounding the cursor 302. As shown, the contact area 203 is on the cursor handle 1501 such that the cursor 302 is ready to be moved. The contact area 203 may be adjacent to the cursor 302, such as a quarter inch or a half inch away from the cursor or more, as long as the contact area 203 is on (either fully or partially, such as in an overlapping manner) the cursor handle 1501. In other words, the edge of the contact area 203 closest to the cursor 302 (or, depending upon how distance is measured, the center 504 of the contact area 203) may be, e.g., a quarter inch, a half inch, or more from the cursor 302. As the user moves his or her finger downward and to the right in FIG. 15, for example, the cursor handle 1501 and the cursor 302 simultaneously move with the finger and in the same direction as the finger. At some point during the movement, the finger has now moved to a location indicated by 203a, the cursor 302 has moved to a position indicated by 302a, and the cursor handle 1501 has moved to a position indicated by 1501a. During the movement, the cursor 302 remains adjacent to the finger (i.e., adjacent to the contact area 203) and the cursor handle 302: The cursor 302 and/or the cursor handle 1501 may move in such a manner that they remain in a fixed positional relationship relative to each other and/or to the finger (i.e., with the contact area 203). In other words, if the contact area 203 moves right X pixels and down Y pixels, for example, then the cursor handle 1501 and the cursor 302 would also move right X pixels and down Y pixels, simultaneously with the contact area 203. This type of movement is shown in FIG. 15. Alternatively, there may be some flexibility in the relative positions of these elements during movement. While the finger is shown to be touching below and to the right of the cursor 302 in FIG. 15, this is merely illustrative and of course the finger may be in any location around the cursor 302. In FIG. 16, the user may now choose to move his or her finger, e.g., in an upward/leftward direction in that figure. At some point during the movement, the cursor 302 may end up at an edge and/or corner of the touch-sensitive display 201. In this example, the cursor 302 ends up in the upper left corner of the touch-sensitive display 201, in a position indicated by 302b. As can be seen, use of the cursor handle 1501b may allow for the user to accurately control movement of the cursor 302b even near edges and corners, because the user's finger may still be at an inward position on the touch-sensitive display 201.

In addition to cursor movement, a user can cause an event to be funneled to the location of the cursor 302 solely by interacting with the cursor handle and without necessarily interacting directly with the cursor 302. For example, by tapping (i.e., touching the user's finger to an area on the touch-sensitive display 201 and then quickly removing the finger) or double-tapping either the cursor 302 or the cursor handle may cause a mouse button event to be sent to the location of the cursor 302 associated with the cursor handle. In addition, the type of event may be controlled through interaction with the cursor handle. For example, referring back to FIG. 10, the cursor handle 1001 may have one or more regions that allow for further control of the cursor 302. In this case, the various regions 1002-1006 allow the user to indicate which type of mouse button event to funnel to the location of the cursor 302. By tapping, for example, on region 1002, a left mouse button down event (which may be followed by a left mouse button up event) may be sent to the location of the cursor 302. Or, by tapping, for example, on region 1003, a right mouse button down event (which may be followed by a right mouse button up event) may be sent to the location of the cursor 302. Or, by tapping, for example, on region 1004, a left mouse button down event (which may be followed by a left mouse button up event) modified with a shift key may be sent to the location of the cursor 302. Or, by tapping, for example, on region 1005, a left mouse button down event (which may be followed by a left mouse button up event) modified by an Alternate key (ALT) may be sent to the location of the cursor 302. Or, by tapping, for example, on region 1006, a left mouse button down event (which may be followed by a left mouse button up event) modified by a Control key (CTRL) may be sent to the location of the cursor 302. As shown, the various regions 1002-1006 may be labeled for the convenience of the user. Of course, these examples are simply that—examples. Left and/or right clicks with or without modifier keys are not the only functions that may be provided in connection with a cursor handle. For instance, other functions selectable from a cursor handle may include wheel mouse scroll events, paging up/down, the press of any key on a keyboard (e.g., emulating control-v for the paste function) or other commands that may be unique to a particular software application, such as changing the painting mode from an "oil paint" mode to a "pastel chalk" mode in a drawing application.

The cursor handle may disappear after a certain amount of time of non-use so that it does not serve as a visual distraction. For example, the cursor handle may begin to fade out after a predetermined period (e.g., five seconds) of non-use of the cursor handle and/or of the entire graphical user interface (where no stylus interacts with or touches the display). In this case, the cursor handle may be restored (i.e., re-displayed) in response to the detection of a stylus upon the display or near the cursor. Similarly, the cursor handle may be hidden if cursor-positioning input is detected from other input devices, such as from a pen-type stylus as opposed to a human finger, or from a mouse.

Referring to FIG. 11, another example of a cursor handle 1101 may be invoked that can be configured to provide a particular type of event to the location of the cursor 302. In this example, the cursor handle 1101 is labeled with an indicator 1102 of the type of event (in this case, a left mouse button down event) that tapping on the cursor handle 1101 would generate. The type of event to be generated may be changed through user input to the computer 100, such as through a gesture made on the touch-sensitive display 201 or by other means. FIG. 11 also illustrates how movement of the cursor 302 using a cursor handle such as cursor handle 1101 allows the user to precisely position the cursor 302 over small objects that the user wishes to select or otherwise interact with. In this example, three checkboxes 1103, 1104, 1105 are displayed. By tapping on one of the checkboxes, that checkbox toggles between being checked and unchecked. Without the cursor handle 1101, the user would have to place his or her finger over the cursor 302 itself and attempt to move the cursor over the correct one of the checkboxes 1103-1105. This may be difficult because the user's finger may be larger than the displayed checkboxes 1103-1105, so the user would have to continually remove his or her finger to see whether the cursor has been correctly positioned. In contrast, according to aspects of the present invention the user may simply drag the cursor handle 1101, and may accurately position the cursor 302 over the correct checkbox by watching as cursor 302 moves with the cursor handle 1101. Alternatively, the user may simply tap his or her finger on one of the checkboxes 1103-1105, regardless of the position of the cursor 302, and in response the cursor 302 may move to the location of the tap over the checkbox. In this example, the user has chosen checkbox 1104. To check or uncheck the checkbox 1104, the user may tap anywhere on the cursor handle 1101 (not necessarily on the cursor 302 itself) or otherwise near the cursor 302, e.g., within a particular distance from the cursor 302, and in response a left mouse button down event (which may be followed by a left mouse button up event) would be sent to the location under the cursor 302, which in this example is the checkbox 1104. If the cursor control 1001 of FIG. 10 were instead being used, then the type of event sent to the checkbox 1104 would depend upon which region of the cursor handle 1001 was tapped by the user. Although a tap is illustratively referred to as the type of touch input used to send an event, any type of touch interaction may be used.

The cursor handle may be of any shape and size as desired, and may be symmetrical or asymmetrical in shape. In addition, the active region may or may not be the same shape and/or size as the cursor handle as displayed. For example, referring to FIG. 12, a square cursor handle 1201 is shown, which may operate as described above with regard to FIG. 10 or 11. As another example, the cursor handle may take the shape of the contact area and thus conform around the area of contact by the user's finger, thereby obscuring a minimal portion of the display. As yet another example of a cursor handle style, a remote-style cursor handle 1301 is illustratively shown in FIG. 13. In that example, the cursor handle 1301 may not surround the cursor 302 but may instead be remote from the cursor 302. Grabbing and dragging anywhere in the cursor handle 1301 may cause the cursor handle 1301 and the cursor 302 to move. Likewise, tapping anywhere in the cursor handle 1301 may cause an event to be sent to the location of the cursor 302. As still another example of a cursor handle, FIG. 14 shows a cursor handle 1403 having a plurality of concentric circles to indicate a general region in which the user may interact with the cursor handle 1403. The cursor handle 1403 also has a magnifying region 1402 that magnifies whatever is underneath the magnifying region 1402. A point-style cursor 1401 may be used in this embodiment or in any other embodiment to allow the user to more easily see what it underneath the cursor 1401. Of course, any style of cursor may be used for any of the described embodiments.

Referring again to FIG. 4, if the computer 100 determines in step 403 that the finger is not near the cursor 302, then the computer 100 may determine in step 405 whether the finger input is a tap or a drag. If a tap, the cursor 302 is moved to the location of the tap in step 406 and the cursor is returned to the idle state in step 401. If a drag, then the cursor 302 is dragged in step 407 in accordance with the drag input, thereby allowing the user to hover the cursor 302 to a desired location. The cursor 302 is then returned to the idle state in step 401. In the present example, when the user's finger is removed from the cursor handle, the special cursor control mode may end, e.g., after a time delay, returning to normal cursor control in step 401. Alternatively, the special cursor control mode may remain in force unless and until the user commands the computer 100 to return to normal cursor control mode, such as through a gesture made on the touch-sensitive display 201 or by other means.

Thus, a solution to controlling a displayed cursor on a computer display with a user's finger or other inaccurate stylus has been described. By interacting with the cursor handle instead of the cursor, the user may more easily see the cursor while it moves, thereby making it easier to accurately target small objects that were previously difficult to target. In addition, by funneling taps and/or other input from the cursor handle to the location of the cursor, the user does not need to worry about precisely where the tap and/or other input is made, as long as the cursor is accurately positioned.

What is claimed is:

1. In a computer coupled to a touch-sensitive display, a method for controlling input using a cursor, the method comprising:
   displaying the cursor on the touch-sensitive display;
   receiving a dragging touch input to the touch-sensitive display beginning at a first location adjacent to the cursor, the first location being within a predetermined radial distance from the cursor, the radial distance defining a roughly circular area;
   determining if the dragging touch input starts within a region defined by the predetermined radial distance from the cursor; and
   responsive to receiving the dragging touch input, displaying a control boundary adjacent to the cursor and moving the displayed cursor and the displayed control boundary to follow and remain adjacent to the dragging touch input, wherein the moving is responsive to the determination that the first location is within the predetermined radial distance.

2. The method of claim 1, wherein the first location is at least a quarter inch away from the displayed cursor.

3. The method of claim 1, further comprising:
   receiving a tap input on the touch-sensitive display at a second location adjacent to the displayed cursor and on or within the control boundary; and
   in response to the tap input, sending a mouse button down event to a location of the displayed cursor.

4. The method of claim 3, wherein the second location is at least a quarter inch away from the displayed cursor.

5. A computer-readable medium storing computer-executable instructions for performing the method recited in claim 1.

6. In a computer coupled to a touch-sensitive display, a method for controlling input using a cursor, the method comprising:
- displaying the cursor on the touch-sensitive display;
- receiving a touch input on the touch-sensitive display adjacent to the cursor;
- determining whether the touch input is within a region surrounding the cursor, wherein the region is a circle centered around the displayed cursor; and
- responsive to the touch input being within the region, displaying a representation of a control and a control boundary, and sending a mouse button down event to a location near the displayed cursor.

7. The method of claim 6, wherein the touch input is a tap input made at a location at least a quarter inch away from the cursor.

8. The method of claim 6, wherein the mouse button down event is a left mouse button down event or a right mouse button down event depending upon a location of the touch input.

9. The method of claim 6, wherein the circle has a radius of at least a quarter inch.

10. A computer-readable storage medium storing computer-executable instructions for performing the method recited in claim 6.

11. In a computer coupled to a touch-sensitive device, a method for controlling input using a cursor, the method comprising:
- displaying the cursor;
- receiving a first touch input on the touch-sensitive device;
- determining if the first touch is within a predetermined radial distance of the cursor, the radial distance defining a roughly circular area and a cursor handle boundary;
- responsive to the first touch input, displaying a cursor handle adjacent to the cursor when the first touch is within the predetermined distance of the cursor;
- receiving a second touch input on the touch-sensitive device adjacent to the cursor and on or within the predetermined distance directed to the displayed cursor handle; and
- controlling movement of the cursor in accordance with the second touch input, wherein the cursor handle moves with the cursor.

12. The method of claim 11, wherein the displayed cursor handle does not touch the cursor.

13. The method of claim 11, wherein the cursor handle is displayed so as to surround the cursor.

14. The method of claim 11, further comprising:
- receiving a third touch input at the touch-sensitive device adjacent to the cursor;
- determining whether the third touch input is directed to the cursor handle, and
- responsive to the third touch input, sending a mouse down button down event to a location of the displayed cursor.

15. The method of claim 11, wherein the second touch input is received at a location at least a quarter inch away from the displayed cursor.

16. The method of claim 11, wherein the cursor handle includes a magnifying region that magnifies an area of a graphical user interface within the region.

17. A computer-readable medium storing computer-executable instructions for performing the method recited in claim 11.

* * * * *